United States Patent
Mylonas

(10) Patent No.: US 11,227,347 B2
(45) Date of Patent: Jan. 18, 2022

(54) SYSTEM AND METHOD FOR UTILIZING TRANSIT DATA TO DETERMINE WHERE A TRANSIT TRAVELER'S ORDER IS PLACED IN AN ORDER QUEUE

(71) Applicant: Landstar Development Corporation, Calgary (CA)

(72) Inventor: George Mylonas, Calgary (CA)

(73) Assignee: Landstar Development Corporation, Calgary (CA)

( * ) Notice: Subject to any disclaimer, the term of this patent is extended or adjusted under 35 U.S.C. 154(b) by 490 days.

(21) Appl. No.: 15/946,176

(22) Filed: Apr. 5, 2018

(65) Prior Publication Data

US 2019/0311446 A1 Oct. 10, 2019

(51) Int. Cl.
*G06Q 50/12* (2012.01)
*H04W 4/02* (2018.01)
*G06Q 30/06* (2012.01)

(52) U.S. Cl.
CPC ......... *G06Q 50/12* (2013.01); *G06Q 30/0601* (2013.01); *H04W 4/027* (2013.01)

(58) Field of Classification Search
CPC .... G06Q 50/12; G06Q 30/0601; H04W 4/027
USPC .......................................................... 705/15
See application file for complete search history.

(56) References Cited

U.S. PATENT DOCUMENTS

| 8,583,511 | B2 | 11/2013 | Hendrickson |
| 9,406,084 | B2 | 8/2016 | Havas |
| 2006/0178932 | A1 | 8/2006 | Lang |
| 2007/0168205 | A1 * | 7/2007 | Carlson ................. G06Q 30/00 705/15 |
| 2009/0198580 | A1 | 8/2009 | Broberg et al. |

(Continued)

FOREIGN PATENT DOCUMENTS

| CA | 2839208 | 7/2014 |
| CA | 2839208 A1 * | 7/2014 |

(Continued)

OTHER PUBLICATIONS

Datasheet for Mobile Starbucks Application, Starbucks Mobile App, Oct. 26, 2016, 2 pages, http://www.starbucks.com/coffeehouse/mobile-order.

(Continued)

*Primary Examiner* — Russell S Glass
(74) *Attorney, Agent, or Firm* — Cesari and McKenna, LLP

(57) ABSTRACT

Embodiments described herein provide a system and method that utilize transit data to determine where a transit traveler's order is placed in an order queue at a vendor. A transit traveler may execute an application, associated with an ordering system, on a mobile device. Utilizing the application, the transit traveler may select one or more menu items from a selected vendor. The ordering system may then utilize the transit data, associated with a transit vehicle the transit traveler is traveling on or intends to board, to determine the anticipated time of arrival of the transit traveler at the selected vendor. The vendor device then executes order placement software, provided by the ordering system, to place the transit traveler's order in a particular position within an order queue utilizing the anticipated time of arrival and a fulfillment time.

12 Claims, 6 Drawing Sheets

(56) References Cited

U.S. PATENT DOCUMENTS

| | | | | |
|---|---|---|---|---|
| 2013/0138515 A1* | 5/2013 | Taniguchi | ............ | G06Q 10/087 705/15 |
| 2013/0232002 A1 | 9/2013 | Zhao et al. | | |
| 2013/0317921 A1* | 11/2013 | Havas | ................. | G06Q 20/405 705/15 |
| 2015/0081532 A1 | 3/2015 | Lewis et al. | | |
| 2015/0100416 A1 | 4/2015 | Blackhurst et al. | | |
| 2015/0164264 A1 | 6/2015 | Studor et al. | | |
| 2015/0187026 A1* | 7/2015 | Holman | ................. | G07F 9/023 705/15 |
| 2015/0230653 A1 | 8/2015 | Cheng | | |
| 2018/0253805 A1* | 9/2018 | Kelly | .................. | G06Q 20/322 |
| 2018/0350144 A1* | 12/2018 | Rathod | .............. | G06Q 20/3276 |

FOREIGN PATENT DOCUMENTS

| | | | | |
|---|---|---|---|---|
| CA | 2820432 | 12/2014 | | |
| CA | 2820432 A1 * | 12/2014 | ............ | G06Q 10/08 |
| WO | 201719501 | 2/2017 | | |
| WO | WO-2017019501 A1 * | 2/2017 | ............ | G06Q 50/10 |

OTHER PUBLICATIONS

Abstract, Kharif, Olga, "These Apps Mean You'lll Never Wait in Line for Coffee Again" Bloomberg, 2 pages, http://www.bloomberg.com/news/articles/2014-11-26/preorder-food-coffee-apps-can-boost-restaurant-sales, Nov. 26, 2014.

Vivanco, Leonor, "Want to skip the order line? Fast food restaurants have apps for that," Chicago Tribune, Aug. 7, 2015, http://www.chicagotribune.com/business/ct-restaurant-food-app-0811-biz-20150807-story.html, 3 pages.

Mobile Order & Pay Available in UK Starbucks Stores, Starbucks Newsroom, Community, Sep. 30, 2015, https://news.starbucks.com/news/starbucks-launches-mobile-order-pay-in-the-uk, 3 pages.

Starbucks Union Station Washington, DC , Oct. 26, 2016, 2 pages http://www.unionstationdc.com/store/starbucks/5170/2138814762.

Cafe Coffee Day—Rajiv Chowk Metro Station (New Delhi), Oct. 26, 2016, 1 page, https://www.cafecoffeeday.com/shop-locator/new-delhi/rajiv-chowk/metro-station.

Cafe Coffee Day—Mobile App, Mar. 20, 2018, 4 pages, https://play.google.com/store/apps/details?id=in.fourthlion.ccd.mobileapp&hl=en.

Beat the Q (Beta), Oct. 26, 2016, 2 pages, https://www.beattheq.com/consumers.

OrderAhead App, Caviar, Oct. 26, 2016, 2 pages, https://www.orderaheadapp.com/learn-more.

Bakker, Evan, "Quick-service restaurants like Taco Bell are using mobile commerce apps to drive higher order values and boost sales" Abstract, Business Insider, Jul. 29, 2015, 4 pages, http://www.businessinsider.com/fast-food-chain-mobile-order-ahead-apps-2015-4.

Dunkin' Donuts® Mobile App with On-the-Go Ordering BzzCampaign, Oct. 26, 2016, 4 pages, https://www.bzzagent.com/pc/dunkin-donuts-ordering-app/gallery/reviews/.

Search Report and Written Opinion for corresponding PCT Application No. PCT/CA2019/050385 filed Mar. 28, 2019, dated Jun. 3, 2019, 8 pages.

* cited by examiner

SYSTEM AND METHOD FOR UTILIZING
TRANSIT DATA TO DETERMINE WHERE A
TRANSIT TRAVELER'S ORDER IS PLACED
IN AN ORDER QUEUE

BACKGROUND

Technical Field

This invention relates generally to a system and method for submitting an online order to a vendor, and more specifically to utilizing transit data to determine where a transit traveler's order is placed in an order queue of a vendor.

Background Information

Retail and food vendors typically have customers who lead hurried lifestyles and desire small wait times and speedy services. Therefore, it is desirable to minimize the time from when the customer enters the vendor's physical premises, to when the customer receives an ordered item (i.e., turnaround time) to improve overall sales and efficiency at the vendor, as well as to improve customer service experience and satisfaction. One strategy to minimize turnaround time is to allow customers to pre-order an item remotely scheduled for later pickup. However, and in certain instances, the customer may still have to wait for the order if the order has not been prepared when the customer arrives at the vendor, or the customer may still have to wait for the order if there is a line when the customer arrives at the vendor. In other instances, the customer's order may have been prepared too early such that when the customer arrives at the vendor, the customer's order is not "fresh" (e.g., warm or cold depending on what was ordered). In addition, vendors typically prepare the orders in sequential order, based on the time at which the order is received at the vendor. Thus, the vendor may not be operating efficiently to prepare orders for different customers that may arrive at different times and have ordered different types of items that require different preparation times. Therefore, there is a need for a system and method for submitting an order to a vendor ahead of time through electronic communications, which increases overall efficiency for the vendor, and also improves customer service and satisfaction.

SUMMARY

Embodiments described herein provide a system and method that utilize transit data to determine where a transit traveler's order is placed in an order queue at a vendor. Specifically, a transit traveler may execute an ordering system application, provided by an ordering system, on a mobile device. The transit traveler may utilize the application to select one or more items from a vendor, or a plurality of vendors. For example, the vendor may be located at or near stops along a route of a transit vehicle that is associated with a transit authority. The selection of items may be transmitted from the ordering system application on the mobile device to the ordering system.

The transit vehicle may be a bus line, a train-line, a shuttle line, subway, an air transportation, or any other mode of transportation operated by a transit authority that utilizes one or more vehicles to transport individuals throughout and between geographical locations. For example, the transit vehicle may be a particular train-line that is scheduled to make one or more stops at predetermined times at particular locations/stations. The ordering system may obtain transit data, associated with the transit authority, which includes transit schedule information of the transit vehicle, delay/acceleration information associated with the transit vehicle, rate of travel information associated with the transit vehicle, real time location information associated with the transit vehicle, and/or general status information associated with the transit vehicle (e.g., service outage).

The ordering system may determine the transit vehicle the transit traveler has boarded or is likely to board. Specifically, the ordering system may determine if the transit traveler has selected the items after boarding a transit vehicle by comparing the location and/or movement of the transit traveler (e.g., sensor data from the mobile device) with the location and/or rate of travel of the transit vehicle. If it is determined that the transit traveler has not boarded the transit vehicle, the ordering system may determine which transit vehicle the transit traveler is likely to board utilizing the location of the transit traveler, the location of the vendor, and/or a variety of different factors/algorithms.

The ordering system may then utilize the transit data, associated with the transit vehicle the transit traveler has boarded, or is likely to board, to determine the anticipated time of arrival of the transit traveler at the selected vendor's physical premises. If the selected vendor is a certain distance away from the particular station/stop at which the transit traveler disembarks from the transit vehicle, the ordering system may utilize the transit data in conjunction with the distance to determine the anticipated time of arrival of the transit traveler at the selected vendor.

The ordering system may then transmit, to a vendor device of the selected vendor, the selection of the items that make up the transit traveler's order and the anticipated time of arrival, and so forth. The vendor device then executes order placement software, provided by the ordering system and the software utilizes the anticipated time of arrival and the fulfillment time (e.g., time to prepare the ordered items) and places the transit traveler's order in a particular position within an order queue.

In an embodiment, the ordering system may determine if the difference between the time at which the transit traveler would like to place the order and the transit traveler's anticipated time of arrival at the selected vendor (hereinafter "transit traveler's time delta") is less than a threshold time value. If the transit traveler's time delta is less than the threshold time value, the transit traveler may not be allowed to order from the vendor, may be prevented from ordering certain items from the vendor, and/or may be provided with a pickup time at the vendor that is later than the transit traveler's anticipated time of arrival. The time delta may be utilized to prevent "line-jumping" and to ensure that the vendor has enough time to prepare the order. If the transit traveler's time delta is less than the threshold time value, the transit traveler may be prevented from ordering from the vendor and/or may be prevented from ordering particular items from the vendor, and/or the transit traveler may be informed that an in-store order must be placed. If the transit traveler's time delta is equal to or greater than the threshold time value, the transit traveler is allowed to order from the selected vendor any of the items available through the ordering system.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
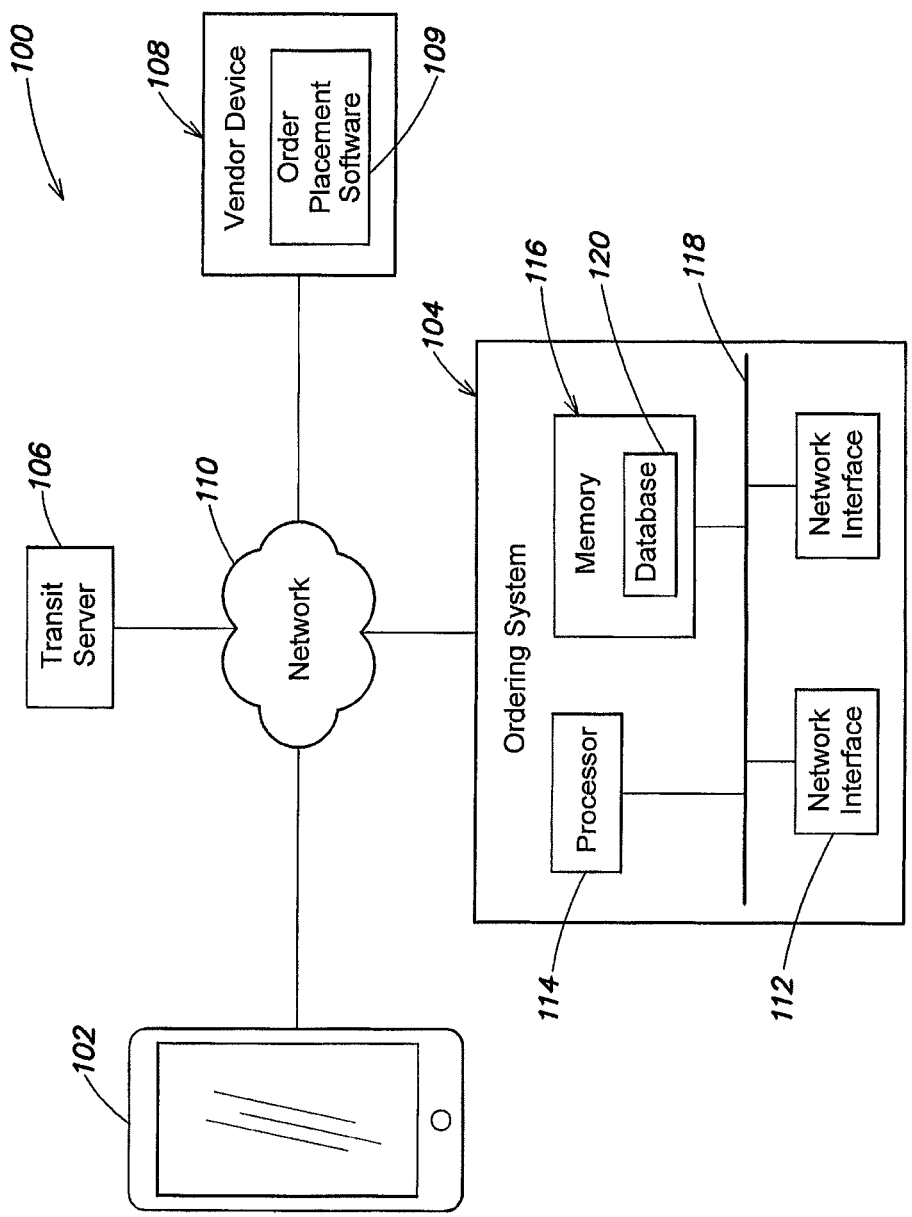
FIG. 1 illustrates a system in accordance with an illustrative embodiment of the invention.

FIG. 1 is an exemplary network environment 100 according to one or more embodiments described herein. A mobile device 102 (e.g., mobile phone), operated by a transit traveler, may communicate with the ordering system 104 over a network 110. Specifically, the mobile device 102 may include one or more sensors (not shown) that determine the location of the mobile device 102, as known by those skilled in the art. The location information may be provided to the ordering system 104 over the network 110. In addition, the mobile device 102 may execute one or more applications through which the transit traveler may make one or more selections to order one or more items from one or more particular vendors. For example, and as described in further detail below, the mobile device 102 may execute an ordering system application, provided by the ordering system 104, that allows the transit traveler to order an item from a particular vendor for a later pickup. The data associated with the selected ordered items may be transmitted over the network 110 to the ordering system 104.

Transit server 106 may be associated with a transit authority, such as a train service or other transportation service that is utilized by individuals to travel throughout different geographical areas. For example, the transit authority may control and operate bus lines, trains lines, shuttle lines, or any other mode of transportation that utilizes one or more vehicles to transport individuals throughout a geographical area. In an embodiment, transit server 106 may communicate with the ordering system 104 over the network 110. Specifically, the transit server 106 may provide (e.g., push) transit data to the ordering system 104 over the network 110. The transit data may include, but is not limited to, transit schedule information indicating the times a train or any other type of transit vehicle is scheduled to stop at particular locations (e.g., train stations) along a predetermined route, delay information indicating the amount of time that the transit vehicle is to be delayed from the scheduled arrival time in arriving at a particular location along the route, acceleration information indicating the amount of time that the transit vehicle will arrive at a particular stop ahead of the scheduled arrival time, rate of travel information associated with the transit vehicle, real time location information associated with the transit vehicle, and/or service information indicating, for example, that a transit vehicle is experience service outage. In an alternative embodiment, the ordering system 104 may obtain (e.g., pull), over the network 110, the transit data from the transit authority and/or one or more external sources (not shown) that store the published transit data. For example, an external source may be a website or storage repository.

Vendor device 108 may be a computing device (e.g., desktop computer, laptop, mobile device, point of service/sale (POS) device) associated with a particular vendor at a particular location. The vendor device 108 may communicate with the ordering system 104 over the network 110. Specifically, the vendor device 108 may receive order information, associated with a transit traveler, from the ordering system 104 indicating that the transit traveler wants to purchase one or more particular items from the vendor for later pickup. In addition, the vendor device 108 may receive, from the ordering system 104, an anticipated time of arrival of the transit travel, as described in further detail below. The vendor device 104 may include order placement software 109, provided by the ordering system 104, which places an order initiated by a transit traveler in a particular position within an order queue, such that the order is ready for pickup by the transit traveler based on the anticipated time of arrival of the transit traveler and the fulfillment time of the order, as described in further detail below.

In addition, the vendor device 108 may register with the ordering system 104 by providing vendor specific information to the ordering system 104 over the network 110. The vendor specific information may include, but is not limited to, a business name, address, hours of operations, one or more threshold time values, one or more threshold distance values, and as applicable, information regarding if and/or when the vendor device 108 should receive order information from the ordering system 104, etc.

The ordering system 104 may comprise a plurality of network interfaces 112, one or more processors 114, and a memory 116 interconnected by a system bus 118. The network interfaces 112 contain the mechanical, electrical, and signaling circuitry for communicating data over physical links coupled to the network 110. The network interfaces 112 may be configured to transmit and/or receive data from the mobile device 102, the transit server 106, and the vendor device 108 using a variety of different communication protocols, as known by those skilled in the art.

The memory 116 comprises a plurality of locations that are addressable by the processor(s) 114 and the network interfaces 112. The memory may store database 120 that stores information received from the mobile device 102, the transit server 106, and the vendor device 108. Although FIG. 1 depicts a database 120, it is expressly contemplated that any other data structure or storage device may be utilized to store information received from the mobile device 102, the transit server 106, and the vendor device 108. The processor(s) 114 may comprise necessary elements or logic adapted to perform the functions associated with the embodiments described herein. Specifically, the processor(s) 114 may utilize the information stored in the database 120 and provided by the mobile device 102, the transit server 106, and the vendor device 108 to transmit an order and anticipated time of arrival to the vendor device 108.

Figure 2A:
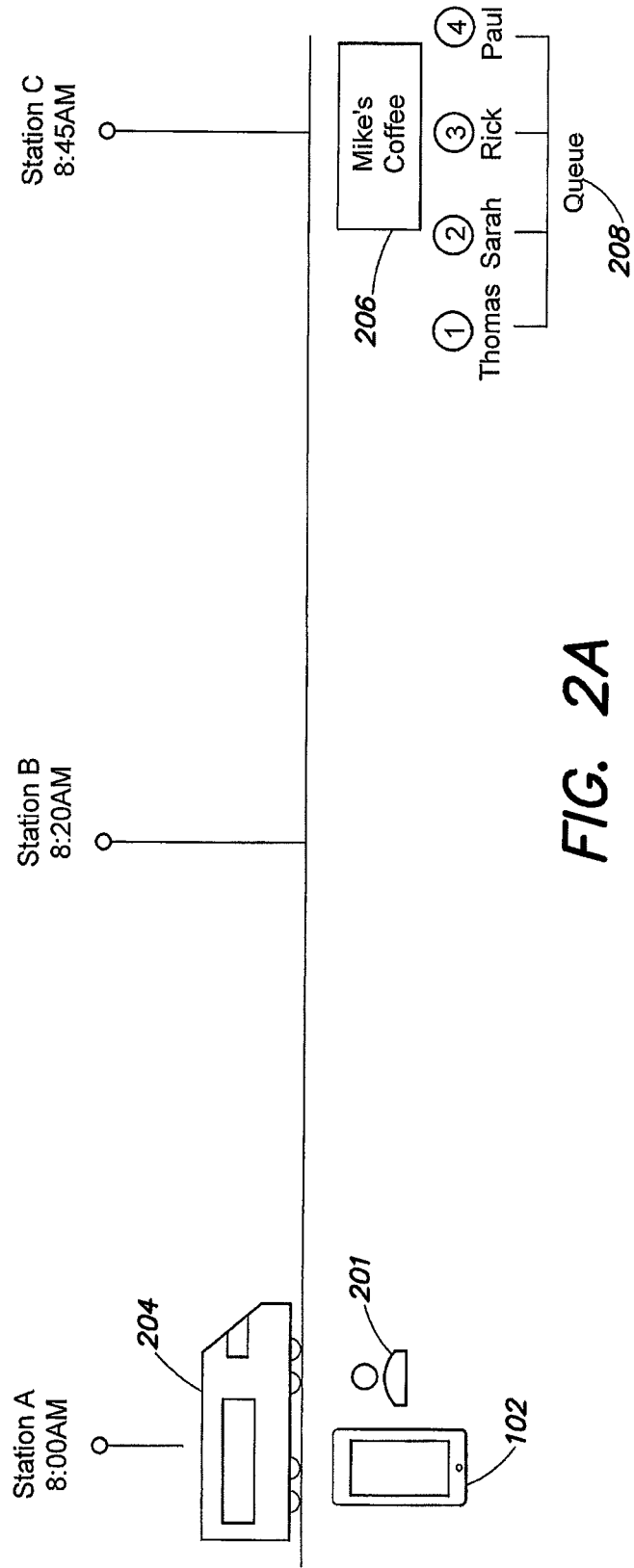
FIG. 2A illustrates an exemplary environment in which the system of FIG. 1 may operate.

FIG. 2A is an exemplary environment in which the system of FIG. 1 may operate. As depicted in FIG. 2A, transit traveler 201 (hereinafter "Rick") is operating the mobile device 102 and plans to board train 204. In addition, and for this example, the ordering system 104 obtains the transit data associated with the transit authority that is operating the train 204. The transit data may include transit schedule information indicating the times at which the train 204 is scheduled to stop at particular locations along its route. For the example as depicted in FIG. 2A, the train 204 is scheduled to stop at Station A at 8:00 AM, at Station B at 8:20 AM, and at Station C at 8:45 AM. In addition, the transit data may include delay information indicating an amount time that a transit vehicle is to be delayed from the scheduled arrival time in arriving at a particular stop along the route, acceleration information indicating an amount of time that a transit vehicle will arrive at a particular stop ahead of the scheduled arrival time, real time location information associated with the transit vehicle, and so forth. Further, the transit data may include rate of travel information associated with the transit vehicle and/or service information (e.g., outage information). This information may be stored in the database 120 of the ordering system 104.

In this example, Rick may have previously downloaded, on the mobile device 102, the ordering system application and registered and setup a personal account with the ordering system 104. For example, Rick may provide personal information (e.g., name, address, credit card information, etc.) over the computer network 110 to the ordering system 104 such that Rick obtains a unique personal account with the ordering system 104. In addition and after providing the credit card information, the ordering system 104 may automatically charge the transit traveler's credit card whenever the transit traveler 201 submits a new order or picks up an order at a vendor, and provides proof of purchase to the vendor. Once registered with the ordering system, Rick may simply execute the application on the mobile device 102 to communicate with the ordering system 104. It is noted that one or more encryption schemes may be utilized to protect the personal information associated with the transit traveler.

Based on the example as depicted in FIG. 2A, Rick intends to board the train 204 at 8:00 AM at Station A and disembark from the train 204 at 8:45 AM at Station C. As such, and when he wakes up at 6:00 AM at home, Rick executes the ordering system application on the mobile device 102 to access his personal account and to view those vendors that have registered with the ordering system 104 and that are located at or near Station C along the route of the train 204. For example, Rick wants to buy, on his way to work, a large coffee and a breakfast sandwich from Mike's Coffee that is located in close proximity to station C. For example, Mike's Coffee may be located at Station C or may be short walk from station C. It is noted that in this example Rick intends to disembark the train 204 at Station C and thus views the vendors located at Station C, however it is expressly contemplated that Rick may view any of the vendors located along the route and at the different stations when executing the application on the mobile device 102.

As such, Rick may utilize the application to select Mike's Coffee from a list of vendors provided through the ordering system application. Based on the selection of a particular vendor, in this example Mike's Coffee, Rick is provided, through the ordering system application, menu items available at Mike's Coffee (e.g., food, beverages, etc.). Rick may then select one or more particular item from the menu, in this example a breakfast sandwich and a large coffee. The selections made by Rick are then transmitted over the network 110 to the ordering system 104 and may be stored in the database 120.

Although reference is made to Rick selecting a particular vendor and then particular items, it is expressly contemplated that Rick may search for a particular item and the ordering system application may present to Rick those vendors that offer the particular item. Rick may then select a particular vendor located at or near the stop Rick plans to disembark the train 204. In an embodiment, one or more vendors may be selected for Rick and presented to Rick through the application (e.g., "pushed") based on the system determining which vendors would likely be of interest to Rick. For example, the system may analyze historical data, registration data, and/or any other types of data to determine that Rick is likely to order from a particular vendor, and thus present that particular vendor to Rick through the application. That is, Rick may select particular items from one or more vendors in any of a variety of different ways utilizing the ordering system application executing on the mobile device 102.

In this example, Rick selected the items prior to boarding the train 204. However, had Rick placed his order while he was on the train 204, the ordering system 104 may determine that Rick is traveling on the train 204 based on a comparison of Rick's location and/or movement (e.g., sensor data from mobile device 102) with the transit data associated with the different transit vehicles. Specifically, if Rick's location and/or movement correspond to the location and/or rate of travel of the train 204 along its route as provided in the transit data, the ordering system 104 may determine that Rick is traveling on the train 204. In this example, Rick's location and/or movement (e.g., at home) does not correspond to the location and/or rate of travel of the train 204, and as such, the ordering system 104 determines that Rick has not boarded the train and thus that Rick has selected the items prior to boarding the train 204.

Based on the determination that Rick selected the items prior to boarding the train 204, the ordering system 104 may utilize Rick's current location, the location of the particular vendor (in this example Mike's Coffee), and/or any of a variety of different factors/algorithms to determine the transit vehicle that Rick is likely to board. Specifically, the ordering system 104 may determine that there is only a single train (e.g., train 204) that travels between Rick's current location and the location of Mike's Coffee, and as such Rick will board the train 204. In addition, the ordering system 104 may determine that the location of Mike's Coffee is closest to Station C, and as such Rick is likely to disembark the train 204 at Station C.

Alternatively, the ordering system may determine that there are a plurality of transit vehicles, e.g., a bus and a train (e.g., train 204), that travel between Rick's current location and the location of Mike's Coffee, and thus the ordering system may utilize one or more factors/algorithms to determine which transit vehicle Rick is likely to board. Such factors may include, but are not limited to, time of day, traffic information, a transit traveler's previous travel choices, etc. For example, the ordering system 104 may determine that Rick will board the train 204 instead of the bus because Rick has taken the train 204 on previous mornings when traveling to work. That is, the ordering system 104 may store historical data, associated with previous travel trips taken by the transit traveler, to assist in determining which transit vehicle the transit traveler will likely board in traveling to the selected vendor.

In addition or alternatively, the ordering system may determine that Rick is likely to take the train 204 instead of the bus based on traffic information that indicates that traveling by train from Rick's location to the selected vendor is quicker and more efficient than traveling by bus. Although reference is made to utilizing a prior travel choice and/or traffic information, it is expressly contemplated that the ordering system may utilize any of a variety of different factors/algorithms in determining which transit vehicle the transit traveler is likely to board.

Alternatively or in addition, Rick may utilize the ordering system application executing on mobile device 102 to explicitly indicate that he will board the train 204 at station A and disembark the train 204 at Station C, and may also indicate that he will be boarding the 8 AM train when he placing his order at 6 AM.

Advantageously, the ordering system 104 may start to monitor Rick's location and/or movement and determine Rick's anticipated time of arrival at a time that is sufficiently close to Rick's boarding time. For example, suppose that Rick placed a lunch order at Mike's Coffee utilizing the ordering system application, and Rick indicated that he will be boarding a train that leaves station A at 11:30 AM. As such, the ordering system 104 may start to monitor's Ricks' location and/or movement (e.g., sensor data from the mobile device) at 11:00 AM, or a different time that is sufficiently closet to Rick's boarding time at 11:30 AM, to accurately determine Rick's anticipated time of arrival.

After receiving the order from Rick, the ordering system 104 may utilize the transit data, associated with the train 204, to determine Rick's anticipated time of arrival. In this example, Rick boards the train 204 at station A at 8:00 AM and is anticipated to arrive at Station C at 8:45 AM. Therefore in this example, the ordering system 104 transmits the order information (e.g., breakfast sandwich and large coffee) and an is anticipated time of arrival to the vendor. If, in the example, Mike's Coffee is located at Station C, the ordering system 104 transmits the order and an anticipated time of arrival of 8:45 AM. Alternatively, if Mike's Coffee is a 5 minute walk from Station C, the ordering system 104 transmits the order information and the anticipated time of arrival of 8:50 AM to the vendor device 108 located at Mike's Coffee.

In an embodiment, the ordering system 104 may confirm that Rick is traveling on the train 204. For example, the ordering system 104 may send a query message through the ordering system application asking Rick to confirm that he is traveling on train 204. As such, Rick may utilize the ordering system application to confirm that he boarded the train 204. In addition or alternatively, the ordering system application may access the sensor data from the mobile device 102, once or at different time intervals, to determine the location of the mobile device 102 and/movement of the mobile device 102. The sensor data may then be compared to the transit data (e.g., location of the transit vehicle at a particular time and/or the rate of travel of the transit vehicle) to determine if Rick is traveling on the train 204. As such, the ordering system 104 may wait to confirm that Rick is traveling on the train 204 before transmitting the order and Rick's anticipated time of arrival to the vendor device 108.

In an embodiment, if Rick has not boarded the train 204 as intended, the ordering system 104 may ensure that the order is not transmitted to the vendor device 108 of Mike's Coffee. Or, if the ordering system 104 has already transmitted the order to the vendor device 108 and Rick has not boarded train 204 or has gotten off at a different stop (e.g., Station B) from which the vendor 108 is not readily accessible, the ordering system 104 may send a cancellation request to Mike's Coffee and Mike's Coffee may cancel the order, if, for example, preparation of the order has not already started. In addition, the system may continue to monitor Rick's location to determine if he is still en route to the vendor 108, if he is still on the train 204, and/or if he is using a different mode of transportation.

Further, if Rick misses train 204 but boards a later train, the ordering system may adjust Rick's anticipated time of arrival to a later time. For example, if Rick boards a later train (confirmed based on a comparison of the location and/or movement of Rick and the location and/or rate of travel of the later train) and the transit data associated with the later train indicates that the later train is to arrive at Station C at 9:20 AM, the ordering system 104 may adjust Rick's anticipated time of arrival to 9:20 AM and then send the order and adjusted anticipated time of arrival to the vendor device or if the order has been previously sent, provide an update message to the vendor device indicating that Rick's anticipated time of arrival has changed to 9:20 AM.

In addition, if Rick disembarks from train 204 at Station B (confirmed based on a comparison of the location and/or movement of Rick and the location and/or rate of travel of the train 204) and decides to walk from Station B to Mike's Coffee, due to, for example, a disabled train, the ordering system 104 may adjust Rick's anticipated time of arrival. For example, if it takes 1 hour and 10 minutes to walk from Station B to Mike's Coffee, the ordering system 104 may adjust Rick's anticipated time of arrival to 9:30 AM and then send the order and adjusted anticipated time of arrival to the vendor device or simply send an update message to the vendor device indicating that Rick's anticipated time of arrival has changed to 9:30 AM.

Therefore, the ordering system may access, once or at different time intervals, the sensor data associated with mobile device 102 to determine Rick's location and/or mode of transportation to ensure the determined anticipated time of arrival for Rick at the selected vendor is accurate and, as appropriate, remains accurate until Rick picks up his order.

It is noted that if the time between when the transit traveler plans to place the order, e.g., when the transit traveler executes the ordering system application on the mobile device, and the anticipated time of arrival ("transit traveler's time delta") is less than a threshold time value, the ordering system 104 may prevent the particular vendor from being selected by the transit traveler or, as appropriate, certain menu items from being selected from a given vendor because of the fulfillment time of the items. For this example, assume that the threshold time value for Mike's Coffee is 30 minutes indicating that a transit traveler that is less than 30 minutes away from Mike's Coffee cannot place an order. Since Rick placed his order at 6:00 AM and his anticipated time of arrival is 8:45 AM, Rick's time delta is 2 hours and 45 minutes. Therefore and since 2 hours and 45 minutes is not less than the threshold time of 30 minutes, Rick is allowed to place an order at Mike's Coffee.

However, assume that instead of placing his order at 6:00 AM, Rick places his order at 8:30 AM when he is on the train 204. In this example, Rick's time delta is 15 minutes and the ordering system 104 would not allow Rick to place his order at Mike's Coffee because Rick's time delta of 15 minutes is less than the threshold time value of 30 minutes. In addition or alternatively, the ordering system 104 may provide to Rick, through the ordering system application, a pickup time that is later than Rick's anticipated time of arrival based on the associated threshold value. With the reference to the example above where Rick's time delta of 15 minutes is less than the threshold time value of 30 minutes, the ordering system 104 may indicate to Rick, through the ordering system application, that Rick may place the order if he willing to pick up the order at 9:00 AM even though his anticipated time of arrival is at 8:45 AM.

Utilizing such a threshold time value ensures that the vendor has enough time to prepare Rick's order and also prevents "line-jumping," i.e., individuals who purposely place orders when they are close to a vendor so that their order is placed at the front of the order queue. For example, a message may appear within the ordering system application informing Rick that he cannot order from the selected vendor and/or cannot order particular items, and/or that he can order items form the selected vendor if he accepts a pickup time that is later than his anticipated time of arrival. In addition, or alternatively, the selected vendor or, as appropriate, the menu items from the selected vendor may be listed in an unselectable form (e.g., grayed out). In an embodiment, a message may appear within the ordering system application informing Rick that he must go into the vendor location to place his order.

The order placement software 109, executing on the vendor device 108, receives the order information and the anticipated time of arrival and utilizes this received information in conjunction with the estimated fulfillment time of Rick's order to place Rick's order in a particular position within queue 208.

In this example, the fulfillment time of Rick's order of the breakfast sandwich and a large coffee is 5 minutes. The fulfillment time may be predetermined based on previous information provided by the vendor through use of the vendor device 108. For example, and when registering with the ordering system 104, the vendor may utilize vendor device 108 and provide an estimated fulfillment time of each item on the vendor's menu. In addition or alternatively, the fulfillment time may take into account other factors, such as, but not limited to, the number of employees working at the vendor, the time of day, day of week, etc.

Thereafter, the order placement software 109, executing on the vendor device 108, may utilize the saved estimated fulfillment time of 5 minutes along with the received anticipated time of arrival of 8:45 AM to place Rick's order at the particular location in the order queue 208 as depicted in FIG. 2A. For example, and with reference to FIG. 2A, Rick's order is placed between Sarah's and Paul's order. Specifically, and based on the fulfillment times associated with Sarah's and Paul's order and their respective anticipated times of arrival, the order placement software may determine that it is most efficient to place Rick's order between Sarah's and Paul's order. That is, the order placement software 109 may implement any of a variety of algorithms, as known by those skilled in the art, to determine which position within the order queue 208 is most appropriate to place Rick's order based on a comparison of Rick's anticipated time of arrival and estimated fulfillment time of Rick's order with the anticipated times of arrival of the vendor's other customers and fulfillment times of the other customers' orders already in the order queue.

Advantageously, Rick's order will be prepared at the appropriate time such that Rick's breakfast sandwich and large coffee will still be warm when he picks up the order at Mike's Coffee. Further, Rick will not have to wait in line and can instead simply and quickly pickup his order, which has already been paid for utilizing the ordering system application, on his way to work. Rick may be required to show identification or proof of purchase (through the application) at the vendor when he arrives. For example, and after Rick has made a purchase utilizing the application, Rick may be provided a QR Code® through the application and Rick may present the QR code® to the vendor as proof of purchase when he picks up his order. Although reference is made to utilizing a QR Code®, it is expressly contemplated that any of a variety of different codes, identifiers, and/or mechanisms may be utilized as proof of purchase.

In addition, and by placing the order within the appropriate position within the order queue, the vendor can be confident that its employees are preparing customer orders in an efficient manner since the orders are prepared based on the anticipated times of arrival of the customers and fulfillment times rather than being prepared based on a time at which an order is received at the vendor.

Figure 2B:
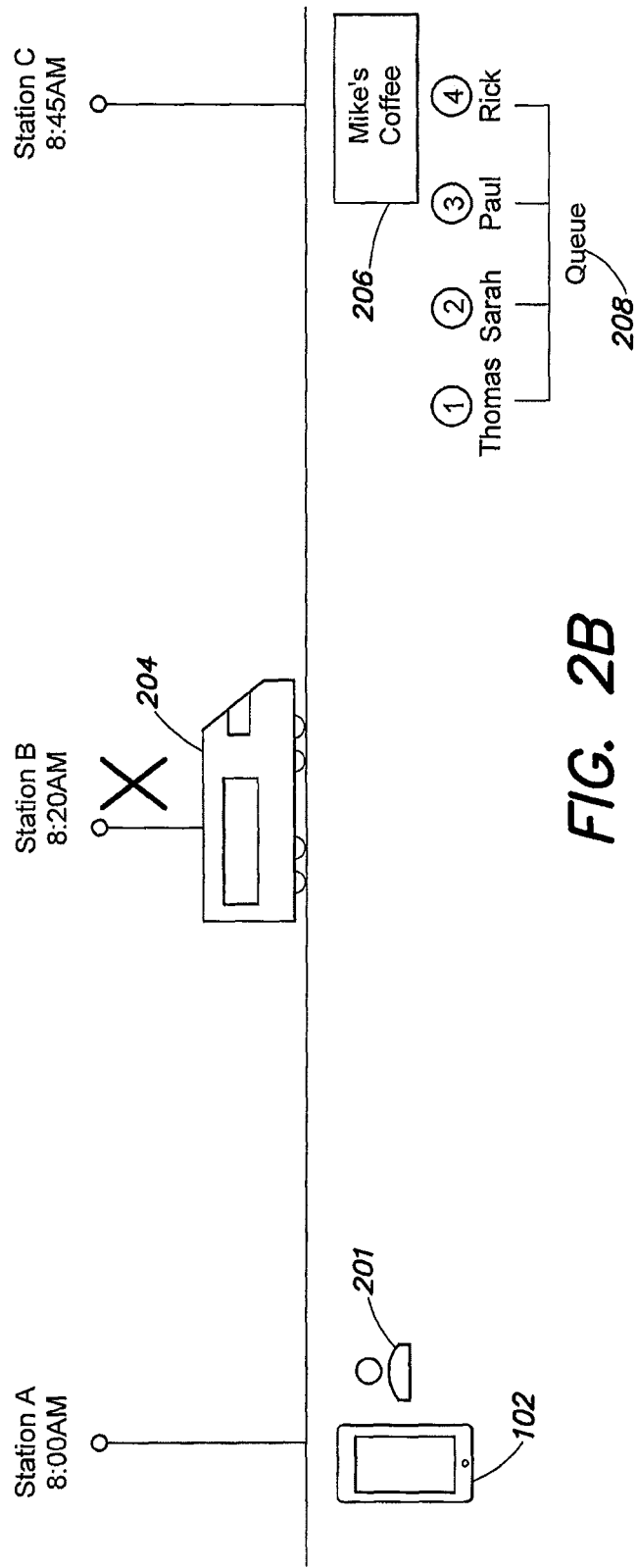
FIG. 2B illustrates an exemplary environment in which the system of FIG. 1 may operate when a transit vehicle experiences a delay.

FIG. 2B is an exemplary environment in which the system of FIG. 1 may operate when the train 204 has experienced a delay. In FIG. 2B and as denoted by the "X", there is a problem at Station B that causes the train 204 to be delayed. For example, the delay may be caused by any of a variety of reasons, such as, but not limited to, a medical emergency with a passenger at Station B, technical issues with the train 204 at Station B, weather conditions, construction, or simply a large number passengers traveling at a particular time and trying to board the train 204 at Station B. As such, the transit authority that operates train 204 may learn that the train 204 has experienced a delay. The transit authority may learn of the delay in any of a variety of ways.

For example, an employee of the transit authority that works at Station B or that is on the train 204 may learn of the delay and provide that information to the transit authority. Alternatively, the transit authority may compare the scheduled departure time of the train 204 at a particular station (e.g., Station B) with the actual departure time of the train 204 at the particular station to determine that the train 204 experienced a delay. In the example depicted in FIG. 2B, the transit authority learns that the delay experienced by the train 204 is 10 minutes.

The ordering system 104 may query or poll the transit server 106 or one or more external sources (not shown) where the transit data is published at regular intervals or at predetermined times to obtain (e.g., pull) updated transit scheduled information, delay information, acceleration information, and/or rate of travel information. In response to the query or polling, the ordering system 104 may obtain the updated transit schedule information, delay information, acceleration information, rate of travel information, and/or service information for storage in the database 120. Alternatively, the transit server 106 may transmit (e.g., push) the updated transit schedule information, delay information, acceleration information, rate of travel information, and/or service information to the ordering system 104 for storage in the database 120 at predetermined times or whenever the information is available.

The ordering system 104 may then utilize the delay time to update Rick's anticipated time of arrival at Mike's Coffee. Specifically, the ordering system 104 determines that Rick's new anticipated time of arrival at Mike's Coffee, due to the 10 minute delay, is 8:55 AM. If the ordering system 104 learns of the delay time prior to sending the order to the vendor device 108, the ordering system 104 adjusts the anticipated time of arrival before sending the order information to the vendor device 108. If the ordering system 104 learns of the delay time after sending the order to the vendor device 108, the ordering system 104 may send an update message to the vendor device 108 indicating that Rick's anticipated time of arrival has changed to 8:55 AM, and the vendor device 108 may then change the position of Rick's order in the queue 208. Therefore, and based on the delay experienced by train 204 at Station B as depicted in FIG. 2B, the position of Rick's order within the queue is moved behind Paul's order.

In an embodiment, a transit traveler may wish to cancel an order for any of a variety of reasons. For example, assume that Rick has boarded train 204 and wants to cancel his order because he decides that he wants to get breakfast at the cafeteria in his office building. In this situation, the ordering system 104 may utilize a cancellation threshold value, provide by the vendor (e.g., Mike's Coffee), to determine if Rick can have his payment returned if he decides to cancel his order. Specifically, during the registration process the vendor may provide a cancellation threshold value for each menu item or may provide a single cancellation threshold value for all menu items. The cancellation threshold value provided by the vendor may be utilized to ensure that an item is not cancelled without penalty after the vendor has begun preparing the item. That is, the cancellation threshold value provided by the vendor may be based on the fulfillment time or any of a variety of different factors (e.g., number of employees, etc.).

For example, suppose that Mike's Coffee, during registration with the ordering system 104, provides a cancellation threshold value of 5 minutes for a coffee and 10 minutes for a breakfast sandwich. As such, Rick will only be able to cancel his coffee order without penalty when Rick's location is more than 5 minutes away from the location of Mike's Coffee. In addition, Rick will only be able to cancel his breakfast sandwich without penalty when Rick's location is more than 10 minutes away from the location of Mike's Coffee. Therefore, and in this example, if Rick wants to cancel the entire order that consists of the coffee and breakfast sandwich, Rick will only be able to cancel the order without penalty when Rick's location is more than 10 minutes away from the location of Mike's Coffee. That is, the overall cancellation threshold value for an order is based on the cancellation threshold value of the item in the order that takes the longest time to prepare (e.g., breakfast sandwich). As such, if Rick does not cancel his order at the appropriate time, the ordering system 104 ensures that Rick is charged for his order regardless of whether Rick picks up his order or not.

Figure 3:
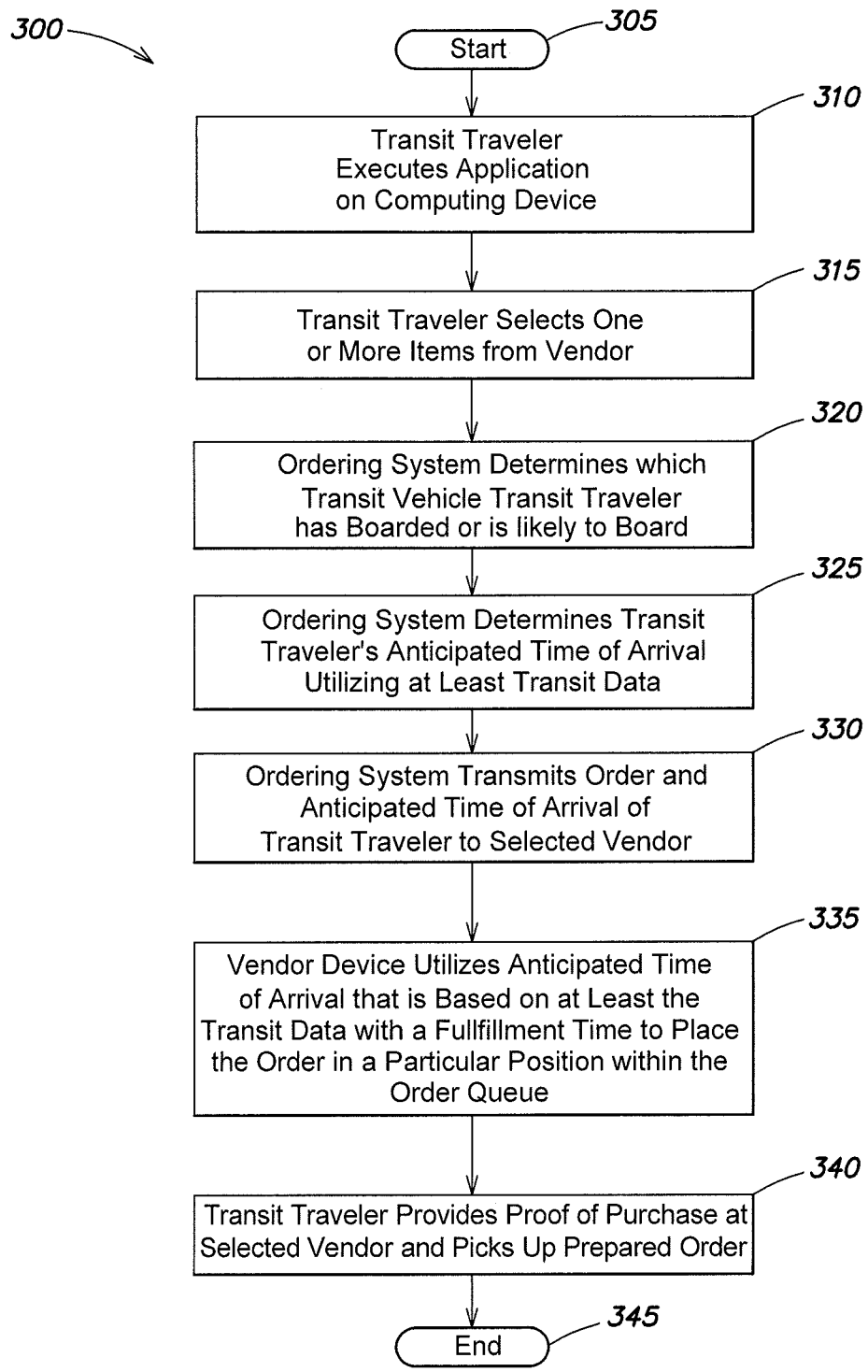
FIG. 3 is an exemplary flow chart for the operation of the system of FIG. 1.

FIG. 3 is an exemplary flow chart of the operation of the system and method for utilizing transit data to determine where in an order queue a transit traveler's order is placed. The procedure 300 starts at step 305 and continues to step 310, where a transit traveler executes the ordering system application on the transit traveler's mobile device. For example, the transit traveler may first download the application, provided by the ordering system 104, on the mobile device 102 and register with the ordering system 104 as described above. The transit traveler may then execute the ordering system application on mobile device 102.

The procedure continues to step 315 and the transit traveler selects, utilizing the ordering system application, one or more items from a vendor located at or near stops along a route of a transit vehicle that is associated with a transit authority. Specifically, the vendors located at or near the different stations (e.g., Station A, Station B, and Station C) may register with ordering system 104 such that the vendors are presented to transit travelers when the transit travelers execute the application on the mobile device 102. For example, and with reference to FIGS. 2A and 2B, Rick selects a large coffee and breakfast sandwich from Mike's Coffee.

In an embodiment, one or more threshold distance values may be utilized. Specifically, a transit traveler may be prevented from ordering one or more items from the vendor if a distance between the transit traveler's location and the particular vendor is equal to or greater than a threshold distance value (e.g., 300 meters). Specifically, the ordering system 104 may allow the transit traveler to view the menu items but prevent the transit traveler from submitting the order that includes the menu items if the distance between the transit traveler's location and the vendor is equal to or greater than the threshold distance value. Advantageously, only those transit travelers within a particular proximity (e.g., within 300 meters) of the vendor may be allowed to place an order with the vendor. The threshold distance value may be configured by the vendor during the registration process. For example, a first vendor may indicate, during the registration process, that transit travelers that are at least 200 meters away may not place orders, while a second vendor may indicate, during the registration process, that transit travelers that are at least 400 meters away may not place orders.

The procedure continues to step 320 and the ordering system determines which transit vehicle the transit traveler has boarded or is likely to board. Specifically, if the transit traveler selects the items after boarding a transit vehicle, the ordering system may determine the transit vehicle the transit traveler is traveling on based on a comparison of the location and/or movement of the transit traveler and the transit data. For example, the ordering system may compare the location and/or movement of the transit traveler (e.g., sensor data) with the location and/or rate of travel of each of the transit vehicles at different times along their respective routes to determine which transit vehicle the transit traveler is traveling on. Specifically, if the location and/or movement of the transit traveler correspond to the location and/or rate of travel of a particular transit vehicle, the ordering system may determine that the transit traveler is traveling on the particular transit vehicle.

If the transit traveler is determined to have selected the items prior to boarding a transit vehicle (e.g., the location and/or movement of the transit traveler does not correspond to the location and/or rate of travel of any transit vehicle), the ordering system may determine the transit vehicle the transit traveler is likely to board utilizing the location of the transit traveler, the location of the vendor, and/or any of a variety of different factors/algorithms. Specifically, the ordering system may utilize the transit data to determine which transit vehicles travel between the transit traveler's location and the location of the vendor, and then utilize a variety of factors, such as street traffic, previous travel trips, etc., to determine the transit vehicle the transit traveler is like to board. In addition, the ordering system may determine the stop the transit traveler is likely to disembark the transit vehicle based on the location of the vendor. Further, the location and/or movement of the transit traveler may be monitored, once or at different time intervals, and compared with the transit data of the transit vehicles to confirm the transit traveler's location and/or mode of transportation.

Alternatively, the transit traveler may utilize the application executing on the mobile device 102 to indicate which transit vehicle the transit traveler is traveling on or intends to board, and may also indicate the stop at which the transit travels plans to disembark from the transit vehicle.

The procedure continues to step 325, and the ordering system determines the transit traveler's anticipated time of arrival at the selected vendor utilizing at least the transit data. Specifically, the ordering system may utilize the transit data along with the location of the selected vendor to determine the anticipated time of arrival of the transit traveler at the selected vendor. For example, if the ordering system obtains an update that the transit traveler is going to arrive at Station C at 8:52 AM due to a minor transit system delay, and that the selected vendor is a 5 minute walk from Station C, the ordering system may determine that the transit traveler's anticipation time of arrival is 8:57 AM. In addition, the anticipated time of arrival and order may be stored in database 120.

The procedure continues to step 330, and the ordering system 104 transmits the anticipated time of arrival and the order information to the vendor device associated with the selected vendor. Specifically, the ordering system 104 transmits the anticipated time of arrival and the order over the network 110 to the vendor device 108. It is noted that if the train 204, for example, incurs additional delay or is determined to arrive earlier, the ordering system 104 may send the vendor device 108 one or more update messages informing the vendor that the transit traveler's anticipated time of arrival has changed (i.e., an updated anticipated time of arrival).

The procedure continues to step 335, and the vendor device utilizes the received anticipated time of arrival of the transit traveler and the estimated fulfillment time of the ordered menu items to place the transit traveler's order in a particular position within the order queue. Specifically, the items selected by the transit traveler and/or conditions at the vendor (e.g., time of day, number of employees working, expected number of customers) may dictate the fulfillment time. For example, if the transit traveler selects a large coffee, the fulfillment time might be 1 minute. However, if the transit traveler selects a pizza, the fulfillment time might be 20 minutes. As such, the order placement software 109 on the vendor device 108 may utilize saved historical data, provided during the vendor's registration process, to determine the fulfillment time for a given order. The fulfillment time may then be utilized in conjunction with the anticipated time of arrival to place the transit traveler's order in a particular position with the order queue of the vendor.

For example, let it be assumed that the transit traveler makes an order at 8:00 AM for a large coffee and a breakfast sandwich at Mike's Coffee and is anticipated to arrive at Mike's Coffee at 8:55 AM based on the transit data (e.g., scheduled time of arrival and a delay that is incurred). In addition, the estimated fulfillment time is determined to be 10 minutes. Therefore, the order placement software 109 on the vendor device 108 may place the transit travel's order at a position in the order queue based on other orders from other customers, associated fulfillment times, and/or anticipated times of arrivals, such that that the order begins to be prepared at 8:40 AM. Advantageously, preparation of the order will be completed at a time that is close to the anticipated time of arrival of 8:55 AM of the transit traveler. Accordingly, the breakfast sandwich and large coffee ordered by the transit traveler will be warm and ready for the transit traveler when he arrives at the vendor at approximately 8:55 AM such that the transit traveler will not have to wait.

The procedure continues to step 340 and the transit traveler arrives at the vendor location, provides proof of purchase, and picks up the prepared order. The transit traveler may be required to show, as proof of purchase, identification information or a verification code (e.g., Quick Response code®) or some other identifier from within the application before receiving his order. The procedure continues to step 345 and ends.

Figure 4A:
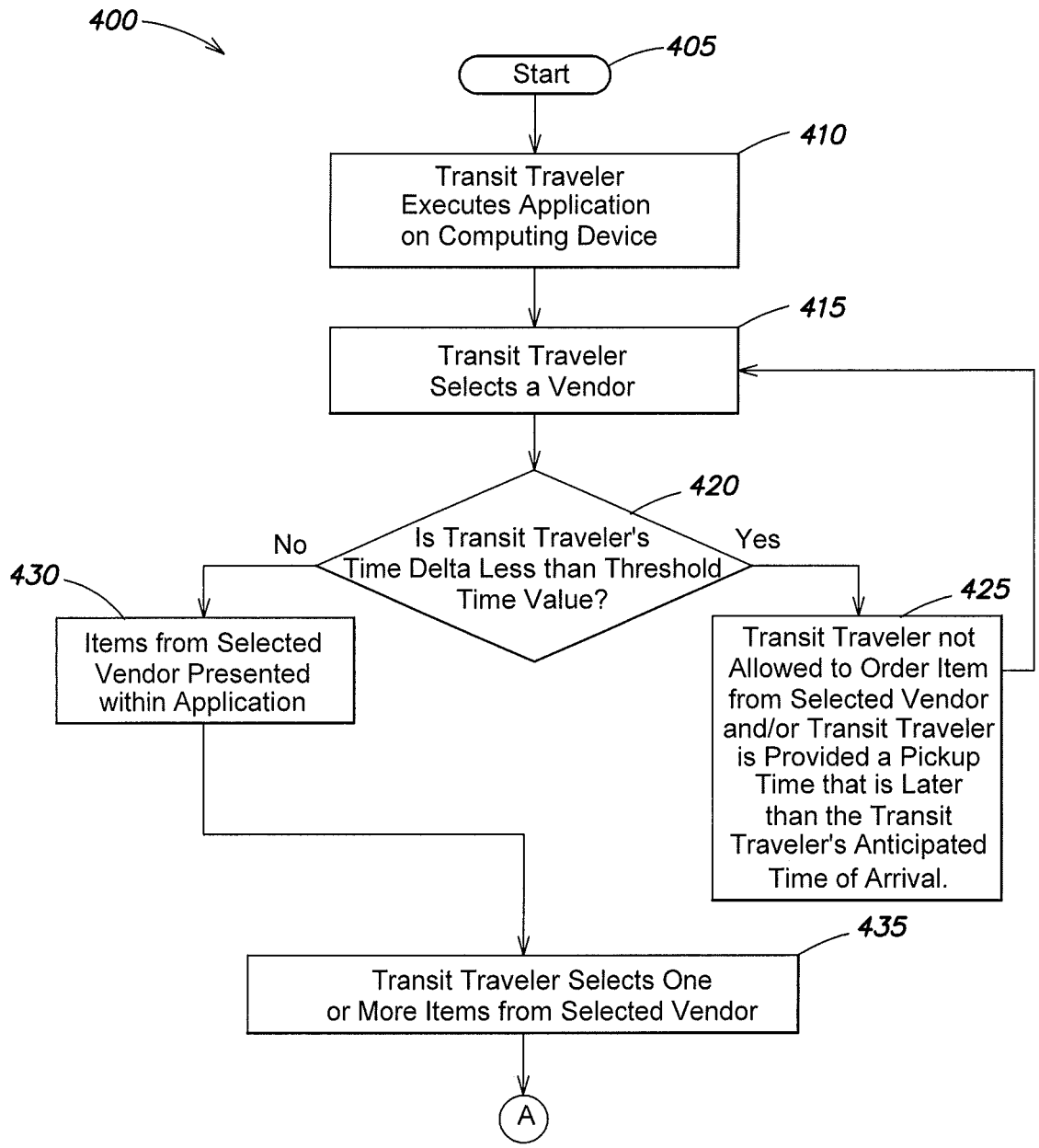
FIGS. 4A and 4B are an exemplary flow chart for the operation of the system of FIG. 1 wherein a threshold time value is utilized to determine if a transit traveler is allowed to order from a vendor.
Figure 4B:
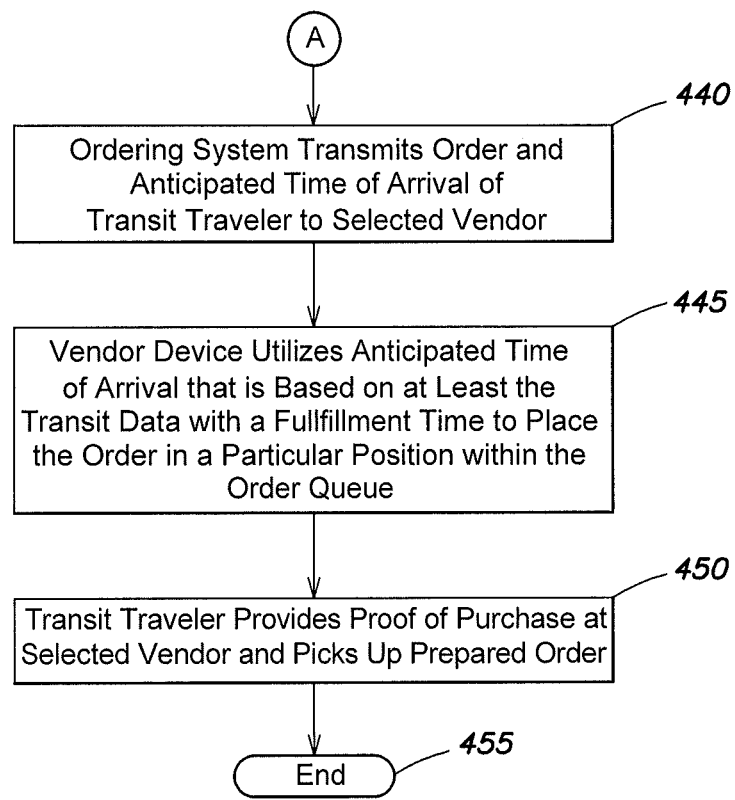

FIGS. 4A and 4B are an exemplary flow chart of the operation of the system and method for utilizing transit data to determine where in an order queue a transit traveler's order is placed utilizing a threshold time value. The procedure 400 starts at step 405 and continues to step 410, where a transit traveler executes the ordering system application executing on the transit traveler's mobile device 102.

The procedure continues to step 415 and the transit traveler selects at least a vendor from a plurality of vendors presented within the ordering system application. The procedure continues to step 420 and the ordering system determines if the transit traveler's time delta is less than a threshold time value for one or more vendors. To determine the time delta, the ordering system determines the anticipated time of arrival that is based on at least the transit data associated with the transit vehicle the transit traveler has boarded or is likely to board, as described above. The difference between the time at which the transit traveler potentially places the order (e.g., when the transit traveler executes the application on his mobile device 102) and the transit traveler's anticipated time of arrival at the vendor is the time delta.

The threshold time value may be any time value selected by the ordering system 104 and/or vendor. For example, the ordering system may select the threshold time value to prevent transit travelers from line-jumping and to ensure that the vendors have enough time to prepare the orders. Alternatively, the threshold time value may be individually selected by each vendor and may be different for each vendor.

For example, vendor A may set the threshold time value to 30 minutes indicating that any transit traveler that is less than 30 minutes away cannot place an order with vendor A, while vendor B may set the threshold time value to 1 hour indicating that any transit traveler that is less than 1 hour away cannot place an order with vendor B. In addition or alternatively, the threshold time value may be utilized to prevent the transit traveler from ordering certain menu items. For example, a vendor may set a threshold time value to 30 minutes indicating that any transit traveler that is less than 30 minutes away may not order pizza that, for example, takes 25 minutes to prepare (e.g., fulfillment time). The vendors may select the threshold time value based on a variety of factors, such as, but not limited to, the type of items being sold by the vendor, how busy the vendor expects to be, the number of employees working, time of day, estimated fulfillment time of particular items, etc.

If at step 420 it is determined that the transit traveler's time delta is less than the threshold time value, the procedure continues to step 425 and the transit traveler is not allowed to order an item from the vendor, and/or the transit traveler is provided a pickup time that is later than the transit traveler's anticipated time of arrival at the vendor. For example, the ordering system may provide a message to the transit traveler through the ordering system application indicating that the transit traveler cannot place an online order for later pick up or that certain items from the menu are not available for an online order, and that the transit traveler instead place order in-store. In an alternative embodiment, the vendor and/or certain items from the vendor may be in an unselectable form (e.g., grayed out) within the application.

In addition, or alternatively, the ordering system 104 may provide, in a form of a message and through the application, a pickup time that is later than the transit traveler's anticipated time of arrival at the vendor, and thus allow the transit traveler to place the order if the transit traveler accepts the presented pickup time. The procedure continues to step 415 where the transit traveler may select a different vendor and/or items within the ordering system application if, for example, the transit traveler did not accept the presented pickup time that is later than the transit traveler's anticipated time of arrival.

If at step 420 it is determined that the transit traveler's time delta is equal to or greater than the threshold time value, the procedure continues to step 430 and the items for purchase from the selected vendor are presented to the transit traveler within the ordering system application in a selectable form. The procedure continues to step 435 and the transit traveler selects one or more items from the selected vendor. For example, and with reference to FIGS. 2A and 2B, Rick selects a large coffee and breakfast sandwich from Mike's Coffee.

In an embodiment, one or more threshold distance values may be utilized. Specifically, a transit traveler may be prevented from ordering one or more items from the vendor if a distance between the transit traveler's location and the particular vendor is equal to or greater than a threshold distance value (e.g., 300 meters). Specifically, the ordering system 104 may allow the transit traveler to view the menu items but prevent the transit traveler from submitting the order that includes the menu items if the distance between the transit traveler's location and the vendor is equal to or greater than the threshold distance value. Advantageously, only those transit traveler's within a particular proximity (e.g., within 300 meters) of the vendor may be allowed to place an order with the vendor.

The procedure continues to step 440, and the ordering system 104 transmits the anticipated time of arrival and the order information to the vendor device associated with the selected vendor. The procedure continues to step 445, and the vendor device utilizes the received anticipated time of arrival of the transit traveler and estimated fulfillment time to place the transit traveler's order in a particular position within the order queue.

The procedure continues to step 450 and the transit traveler arrives at the vendor location, provides proof of purchase and/or a verification code, and picks up the prepared order that was placed within the order queue. The procedure continues to step 455 and ends.

As such, the inventive system and method provides an improvement to an existing technology. Specifically, the inventive system and method utilizes the transit data to ensure that the order is sent over the computer network to the vendor, such that the overall efficiency at the vendor is improved, and also such that customer service and satisfaction is improved. Specifically, the inventive system and method utilizes the transit data to ensure that the customer's order is prepared based on the customer's anticipated time of arrival and the fulfillment time of the order such that the order is fresh (e.g., warm or cold based on what the customer ordered).

Further, and by utilizing the transit data, the inventive system provides an improvement to an existing technology by saving bandwidth and network resource. Specifically, and because the inventive system and method utilizes the transit data, the sensor data for each customer/transit traveler that places an order does not have to be individually monitored. For example, let it be assumed that 10 transit travelers place orders with Mike's Coffee and that all 10 transit travelers board the train 204 at any of the different stations. Therefore, the inventive system and method is not required to keep track of each individual's location, and can instead singularly monitor the transit data to determine the anticipated time of arrival of each of the 10 transit travelers based on the transit data. As such, the inventive system and method can utilize the transit data and the fulfillment times to place the orders, for each of the 10 transit travelers, in particular positions within the order queue. Accordingly and since the transit data can be monitored for all 10 transit travelers, bandwidth and network resources are saved.

In addition, and since the transit data can be utilized to monitor the transit travelers, the ordering system can still monitor the transit travelers in situations where the sensor data associated with the transit travelers is unavailable, such as when a transit vehicle goes underground. Further, and since the transit authority makes the delay information available to the ordering system, greater accuracy of the transit traveler's anticipated time of arrival is achieved.

The foregoing description described certain example embodiments. It will be apparent, however, that other variations and modifications may be made to the described embodiments, with the attainment of some or all of their advantages. For example, although FIGS. 2A and 2B make reference to the transit traveler placing an order from a selected vendor that is approximately 45 minutes away from where the transit traveler boards the train 204, it is expressly contemplated that the embodiments described herein may apply to any transit system that travels over any geographical area.

For example, the train 204 may travel from an originating city in one state (e.g., Boston, Mass.) to a destination city in a different state (New York City, N.Y.), and the transit traveler may utilize the application to make an order while in the originating city or at any point along the route to the destination city. Specifically, the transit traveler may execute the application and select a train associated with a transit authority, select a vendor along the route associated with the travel, and then select a menu item in the manner described above. As such, the inventive system and method can utilize the transit data such that the transit traveler can view vendor order information and place an order to be picked up at any stop or along any route and even when the transit traveler is hundreds or thousands of miles away from where the order is to be picked up, such that the transit traveler is not restricted to the proximity of where the transit traveler is located.

In addition, although reference is made to a single train 204, it is expressly contemplated that the embodiments described herein may apply to a transit traveler utilizing multi-modal transportation, e.g., multiple trains, a bus and a train, subway, a train and a car, airlines, etc.

Further, although reference is made to a single threshold time value, it is expressly contemplated that multiple threshold time values may be utilized. For example, an additional threshold time value may be utilized to prevent transit travelers from ordering particular items that, for example, take a particular amount of time to prepare. For example, a vendor may utilize a first threshold time value of 20 minutes indicating that any transit traveler that is less than 20 minutes away may not order any items from the vendor. The vendor may also utilize a second threshold time value of 30 minutes indicating that any transit traveler that is less than 30 minutes away may not order pizza that, for example, takes 25 minutes to prepare (e.g., fulfillment time).

In an embodiment, the order placement software 109 may prioritize a customer's order over another customer's order based on the one or more external criteria provide by the customer. For example, and with Reference to FIG. 2A, Thomas may have indicated, utilizing the ordering system application, that he is boarding a train at approximately the same time as his anticipated time of arrival at Mike's Coffee to pick up his order. As such, and to ensure that Thomas does not miss the train while waiting for his order, Thomas' order may be given priority over Sarah's order even though his anticipated time of arrival is essentially the same as Sarah's, because Sarah is traveling on and is disembarking from the train.

In an embodiment and when a plurality of transit travelers have the same anticipated time of arrival at the vendor, the order placement software 109 may prioritize a particular transit traveler's order based on any of a variety of factors. For example, the order placement software 109 may prioritize the order of the transit traveler that placed the order first when the plurality of transit travelers have the same anticipated time of arrival at the vendor. Alternatively, the order placement software 109 may prioritize an order based on an analysis of the historical data associated with the trains on which each transit traveler is traveling. For example, if Thomas is traveling on train A that typically arrives on time at Station C and Sarah is traveling on train B that is typically delayed in arriving at Station C, the order placement software 109 may place Thomas' order before Sarah's order even though Thomas and Sarah have the same anticipated time of arrival at Mike's Coffee. Although reference is made to utilizing the reliability of the train on which each transit traveler is traveling on (i.e., analysis of the historical data associated with the trains), it is expressly contemplated that the order placement software 109 may utilize any of a variety of different factors/algorithms in prioritizing an order when a plurality of transit travelers have the same anticipated time of arrival at the vendor.

In an embodiment, the vendor may indicate to the ordering system 104 when it would like to receive its customer orders from the ordering system 104. For example, the vendor may indicate that it would like to receive orders up to an hour before the anticipated time of arrival of its customers. As such, and even though the ordering system 104 received Rick's order at 6:00 AM, the ordering system 104 may transmit Rick's order to the vendor device 108 at 7:45 AM. It is noted that the vendor may utilize any of a variety of criteria to indicate to the ordering system 104 when it would like to receive its orders (e.g., during busy hours customer orders should be received 30 minutes before the customer's anticipated time of arrival). In addition or alternatively, the vendor may also choose to decline to receive online order form the ordering system 104 at one or more particular times. For example, if there vendor is too busy handling in-store orders, or if there are not enough employees working at a particular time of day, etc., the vendor may utilize vendor device 108 to indicate to the ordering system 104 that the vendor will not receive online orders until further notice. Therefore, the vendor can ensure that in-store customers are not neglected and that online orders are not ignored. As such, customer satisfaction is ensured.

Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A method, comprising:
    receiving, over a network and at a ordering system including a processor and a memory, one or more menu items from a vendor and that make up an order of a transit traveler, wherein the one or more menu items are selected utilizing an application executing on a mobile device;
    obtaining, over the network and at the ordering system, transit data that indicates at least times when a transit vehicle is scheduled to stop at one or more predetermined stops along a route of the transit vehicle and rate of travel information for the transit vehicle;
    determining whether the transit traveler has boarded the transit vehicle based on a comparison of at least one of: (1) a location of the mobile device and a location of the transit vehicle from the transit data, and (2) a movement speed of the mobile device and a rate of travel of the transit vehicle obtained from the rate of travel information;
    determining, by the processor of the ordering system, an anticipated time of arrival of the transit traveler at the vendor utilizing the transit data when (1) the location of the mobile device substantially corresponds to the location of the transit vehicle along the route, or (2) the movement speed of the mobile device is substantially equal to the rate of travel of the transit vehicle;
    determining, by the process of the ordering system, the anticipated time of arrival of the transit traveler at the vendor utilizing travel data that is different than the transit data when (1) the location of the mobile device does not substantially corresponds to the location of the transit vehicle, or (2) the movement speed of the mobile device is not substantially equal to the rate of travel of the transit vehicle;
    transmitting, over the computer network, the order and the anticipated time of arrival of the transit traveler to a vendor device associated with the vendor; and
    placing, by order placement software executing on the vendor device, the order at a particular position within an order queue utilizing the anticipated time of arrival and a fulfillment time of the order.

2. The method of claim 1, wherein the transit data further includes a delay time indicating an amount of time the transit vehicle is delayed in arriving at a particular predetermined stop along the route.

3. The method of claim 1, further comprising:
    determining that the transit traveler will board the transit vehicle based on a comparison of at least the location of the mobile device and a location of the vendor.

4. The method of claim 1, further comprising:
    determining, by the processor, a time delta value representing an amount of time between the transit traveler's anticipated time of arrival and a time when the transit traveler executes the application on the mobile device; and
    preventing selection of the one or more menu items on the mobile device when it is determined that the time delta value is less than a threshold time value.

5. The method of claim 1, further comprising
    determining a distance delta value representing a distance between a location of the transit traveler and a location of the vendor; and
    preventing submission of the order when it is determined that the distance delta value is equal to or greater than a threshold distance value.

6. The method of claim 1, wherein sensor data from the mobile device is utilized to (1) determine the location of the mobile device, or (2) the movement speed of the mobile device.

7. The method of claim 1, wherein the anticipated time of arrival is based on the transit data and a distance between a particular predetermined stop along the route and the vendor.

8. The method of claim 1, further comprising changing the position, by the order placement software executing on the vendor device, of the order within the order queue based on receiving, from the ordering system, update transit data indicating that that transit vehicle is delayed along the route or indicating that the transit vehicle is to arrive at a particular predetermined stop earlier than scheduled.

9. A system, comprising:
    a mobile device executing an application configured to receive a selection of one or more menu items from a vendor wherein the one or more menu items make up an order of a transit traveler;

an ordering system, including a processor and a memory, configured to receive the order from the application executing on the mobile device, the ordering system further configured to obtain transit data that indicates at least times when a transit vehicle is scheduled to stop at one or more predetermined stops along a route of the transit vehicle and rate of travel information for the transit vehicle;

the ordering system configured to determine whether the transit traveler has boarded the transit vehicle based on a comparison of at least one of: (1) a location of the mobile device and a location of the transit vehicle from the transit data, and (2) a movement speed of the mobile device and a rate of travel of the transit vehicle obtained from the rate of travel information;

the ordering system further configured to determine an anticipated time of arrival of the transit traveler at the vendor utilizing the transit data when (1) the location of the mobile device substantially corresponds to the location of the transit vehicle, or (2) the movement speed of the mobile device is substantially equal to the rate of travel of the transit vehicle;

the ordering system further configured to determine the anticipated time of arrival of the transit traveler at the vendor utilizing travel data that is different than the transit data when (1) the location of the mobile device does not substantially correspond to the location of the transit vehicle, or (2) the movement speed of the mobile device is not substantially equal to the rate of travel of the transit vehicle are not substantially equal;

order placement software executing on a vendor device configured to receive the order and the anticipated time of arrival of the transit traveler from the ordering system; and the order placement software further configured to place the order at a particular position within an order queue based on the anticipated time of arrival and a fulfillment time of the order.

10. The system of claim 9, wherein the ordering system is further configured to:

determine a time delta value representing an amount of time between the transit traveler's anticipated time of arrival and a time when the application is executing on the mobile device; and prevent selection of the one or more menu items on the mobile device when it is determined that the time delta value is less than a threshold time value.

11. The system of claim 9, wherein the ordering system is further configured to:

determine a distance delta value representing a distance between a location of the transit traveler and a location of the vendor; and prevent submission of the order when it is determined that the time delta is equal to or greater than the distance delta value.

12. The system of claim 9, wherein the ordering system is further configured to determine that the transit traveler will board the transit vehicle based on at least on a location of the mobile device.

* * * * *